(12) United States Patent
Wu et al.

(10) Patent No.: US 12,501,007 B2
(45) Date of Patent: Dec. 16, 2025

(54) PROJECTOR AND CORRECTION METHOD THEREOF FOR CORRECTING GEOMETRIC DISTORTION OF PROJECTION IMAGE

(71) Applicant: Coretronic Corporation, Hsin-Chu (TW)

(72) Inventors: Po-Yen Wu, Hsinchu (TW); Chih-Lin Wang, Hsin-Chu (TW); Chien-Wei Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 976 days.

(21) Appl. No.: 17/672,688

(22) Filed: Feb. 16, 2022

(65) Prior Publication Data
US 2022/0295026 A1     Sep. 15, 2022

(30) Foreign Application Priority Data
Mar. 12, 2021 (CN) .......................... 202110270794.3

(51) Int. Cl.
*H04N 9/31* (2006.01)
*G01S 7/481* (2006.01)
*G01S 17/08* (2006.01)

(52) U.S. Cl.
CPC ......... *H04N 9/3185* (2013.01); *G01S 7/4814* (2013.01); *G01S 17/08* (2013.01)

(58) Field of Classification Search
CPC .......................... H04N 9/3185; H04N 9/3194
See application file for complete search history.

(56) References Cited

U.S. PATENT DOCUMENTS 6,310,662 B1 * 10/2001 Sunakawa ............ H04N 9/3194
                                                              348/747
7,667,825 B2 *  2/2010 Inoue ........................ G01C 1/00
                                                              356/5.1

(Continued)

FOREIGN PATENT DOCUMENTS

CN      105093789      11/2015
CN      105847773       8/2016

(Continued)

OTHER PUBLICATIONS

Ming Lu et al., "Design and Implementation of Multi-projector Display System Based on Rectangle Blending Region Calibration", Microcomputer Applications, with English abstract, Nov. 20, 2015, pp. 1-4 and 10, vol. 31, No. 11.

(Continued)

*Primary Examiner* — Bao-Luan Q Le
(74) *Attorney, Agent, or Firm* — JCIPRNET (57) ABSTRACT

The invention provides a projector and a correction method thereof. The projector includes a ToF sensor, a calculation unit, a control unit, and a projection module. The ToF sensor senses distances between measurement points on a projection surface and the projector in a distance measurement operation. The calculation unit is coupled to the ToF sensor. The calculation unit calculates at least one distance ratio corresponding to at least one direction according to the distances, and obtains at least one offset angle in the at least one direction according to the at least one distance ratio. The control unit is coupled to the calculation unit and the ToF sensor. The projection module is coupled to the control unit. The control unit performs a keystone correction operation of the projection module according to the at least one offset angle.

18 Claims, 3 Drawing Sheets

(56) References Cited

U.S. PATENT DOCUMENTS

| | | | | |
|---|---|---|---|---|
| 8,267,525 | B2* | 9/2012 | Hsieh | G03B 21/145 348/746 |
| 2003/0035590 | A1* | 2/2003 | Takeuchi | H04N 9/3194 348/E5.076 |
| 2004/0061838 | A1* | 4/2004 | Mochizuki | H04N 5/74 353/69 |
| 2004/0252283 | A1* | 12/2004 | Ogawa | H04N 9/3185 353/69 |
| 2005/0012907 | A1* | 1/2005 | Inoue | G03B 21/14 353/70 |
| 2005/0024598 | A1* | 2/2005 | Inoue | H04N 9/3185 353/69 |
| 2005/0046803 | A1* | 3/2005 | Akutsu | H04N 5/74 353/69 |
| 2005/0046804 | A1* | 3/2005 | Akutsu | H04N 9/3194 353/70 |
| 2005/0190343 | A1* | 9/2005 | Kuwabara | H04N 9/3147 353/70 |
| 2007/0046902 | A1* | 3/2007 | Yajima | G03B 21/142 353/70 |
| 2007/0071430 | A1* | 3/2007 | Iwanaga | G03B 13/20 396/114 |
| 2007/0071431 | A1* | 3/2007 | Inoue | H04N 9/3185 396/116 |
| 2008/0239246 | A1* | 10/2008 | Yamamoto | G03B 21/26 353/69 |
| 2009/0027571 | A1* | 1/2009 | Amano | H04N 9/3185 348/744 |
| 2009/0073323 | A1* | 3/2009 | Inoue | G03B 21/53 348/E7.001 |
| 2009/0091623 | A1* | 4/2009 | Krogstad | G03B 21/53 348/189 |
| 2011/0211064 | A1* | 9/2011 | Furui | H04N 9/3185 348/135 |
| 2012/0176587 | A1 | 7/2012 | Waltermann et al. | |
| 2014/0285778 | A1* | 9/2014 | Inoue | H04N 9/3188 353/121 |
| 2014/0293243 | A1* | 10/2014 | Furui | H04N 9/3185 353/121 |
| 2015/0015852 | A1* | 1/2015 | Furui | H04N 9/3194 353/121 |
| 2015/0103257 | A1* | 4/2015 | Nakashin | H04N 9/3194 348/746 |
| 2015/0116672 | A1* | 4/2015 | Woltman | G03B 21/26 250/206 |

FOREIGN PATENT DOCUMENTS

| | | |
|---|---|---|
| CN | 107085493 | 8/2017 |
| CN | 107749979 | 3/2018 |
| CN | 107885023 | 4/2018 |
| CN | 107920239 | 4/2018 |
| CN | 108289208 | 7/2018 |
| CN | 110456602 | 11/2019 |
| CN | 111443361 | 7/2020 |
| CN | 111800620 | 10/2020 |
| CN | 112422939 | 2/2021 |
| JP | 2005354232 | 12/2005 |
| JP | 2008008650 | 1/2008 |

OTHER PUBLICATIONS

Liang Chen, "The Research and Implementation of Multi-Projector Mosaic Based On Camera Calibration", Shandong University Master's Thesis, with English abstract, Apr. 5, 2008, pp. 1-50.

Achraf Ben-Hamadou et al., "Flexible Projector Calibration for Active Stereoscopic Systems", 2010 IEEE 17th International Conference on Image Processing, Sep. 26-29, 2010, pp. 4241-4244.

"Office Action of China Counterpart Application", issued on Nov. 27, 2023, p. 1-p. 7.

"Notice of Allowance of China Counterpart Application", issued on Apr. 3, 2024, p. 1-p. 4.

* cited by examiner

PROJECTOR AND CORRECTION METHOD THEREOF FOR CORRECTING GEOMETRIC DISTORTION OF PROJECTION IMAGE

CROSS-REFERENCE TO RELATED APPLICATION

This application claims the priority benefit of China application serial no. 202110270794.3, filed on Mar. 12, 2021. The entirety of the above-mentioned patent application is hereby incorporated by reference herein and made a part of this specification.

BACKGROUND OF THE INVENTION

Field of the Invention

The invention relates to a display technique, and more particularly to a projector and a correction method thereof.

Description of Related Art

The keystone correction of the existing projector involves using a projection module to project a projection image to a projection surface based on a correction image, and then after the projection image on the projection surface is captured by a camera to generate a captured image, a processing circuit performs image comparison and analysis on the captured image and the correction image to obtain keystone correction parameters. In other words, the keystone correction operation of the existing projector requires a large amount of computing resources of the processing circuit and requires more computing time. As a result, the processing circuit of the projector needs to have higher computing power, and therefore equipment cost is higher, and a fast and real-time keystone correction function may not be provided in use, resulting in the issue of poor user experience. Accordingly, the following provides solutions in several embodiments.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a projector and a correction method thereof that may automatically correct a geometric distortion of a projection image.

Other objectives and advantages of the invention may be further understood from the technical features disclosed by the invention.

In order to achieve one or part or all of the above objectives or other objectives, a projector of the invention includes a ToF sensor, a calculation unit, a control unit, and a projection module. The ToF sensor is configured to sense a plurality of distances between a plurality of measurement points on a projection surface and the projector in a distance measurement operation. The calculation unit is coupled to the ToF sensor. The calculation unit is configured to calculate at least one distance ratio corresponding to at least one direction according to the plurality of distances, and obtain at least one offset angle in the at least one direction according to the at least one distance ratio. The control unit is coupled to the calculation unit and the ToF sensor. The projection module is coupled to the control unit. The control unit performs a keystone correction operation of the projection module according to the at least one offset angle.

In order to achieve one or part or all of the above objectives or other objectives, the correction method of the invention is used in a projector. The projector includes a ToF sensor, a calculation unit, a control unit, and a projection module. The correction method includes: sensing a plurality of distances between a plurality of measurement points on a projection surface and the projector in a distance measurement operation via the ToF sensor; calculating at least one distance ratio corresponding to at least one direction according to the plurality of distances and obtaining at least one offset angle in the at least one direction according to the at least one distance ratio via the calculation unit; and performing a keystone correction operation of the projection module according to the at least one offset angle via the control unit.

Based on the above, the projector and the correction method thereof of the invention may sense a plurality of distances between the projector and a plurality of measurement points on the projection surface via ToF, and the keystone correction operation of the projection module may be performed based on the plurality of distances.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting.

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
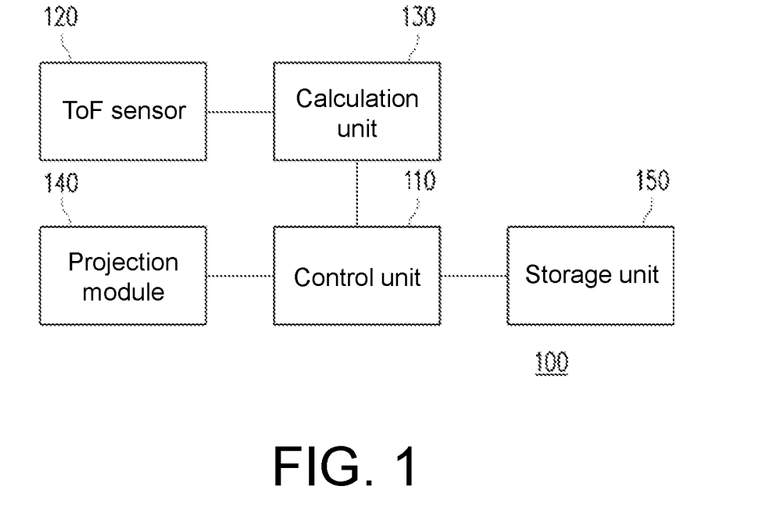
FIG. 1 is a schematic diagram of a projector of an embodiment of the invention.

FIG. 1 is a schematic diagram of a projector of an embodiment of the invention. Referring to FIG. 1, a projector 100 includes a control unit 110, a time-of-flight (ToF) sensor 120, a calculation unit 130, a projection module 140, and a storage unit 150. The control unit 110 is coupled to the calculation unit 130, the projection module 140, and the storage unit 150. The calculation unit 130 is coupled to the ToF sensor 120. In the embodiment, the projector 100 may automatically perform a keystone correction operation of the projection module 140. The ToF sensor 120 may be configured to sense a plurality of distance information (e.g., distance values) between a plurality of measurement points on the projection surface and the projector 100 (distance between measurement point and projector) in a distance measurement operation, and provide the plurality of distance information to the calculation unit 130, wherein the ToF sensor 120 may adopt a direct-ToF technique or an indirect-ToF technique. The calculation unit 130 may calculate at least one offset angle (or tilt angle) in at least one direction according to the plurality of distance information, and provide the at least one offset angle (or tilt angle) to the control unit 110, so that the control unit 110 may perform the keystone correction operation of the projection module 140 according to the at least one offset angle. The keystone correction operation may be implemented, for example, by an existing keystone correction operation formula built in the control unit 110 and related algorithms.

The control unit 110 may include, for example, a central processing unit (CPU), or other programmable general-purpose or special-purpose micro control units (MCUs), microprocessors, digital signal processors (DSPs), programmable controllers, application-specific integrated circuits (ASICs), graphics processing units (GPUs), arithmetic logic units (ALUs), complex programmable logic devices (CPLDs), field-programmable gate arrays (FPGAs), or other similar devices or a combination of the above devices.

The calculation unit 130 may be designed by, for example, a hardware description language (HDL) or any other digital circuits known to those skilled in the art, and is a hardware circuit implemented by a field-programmable gate array (FPGA), a complex programmable logic device (CPLD), or an application-specific integrated circuit (ASIC) so as to have the ability to calculate data.

The projection module 140 may include a related circuit device such as a light source module, an opto-mechanical module, a projection lens group, and an image transmission interface (also called an optical system and an image transmission interface). The light source module may include a light-emitting unit of a discharge bulb, a light-emitting diode, or a laser light source. The opto-mechanical module may include a reflective spatial light modulator or a transmissive spatial light modulator. The reflective spatial light modulator may be, for example, reflective liquid crystal-on-silicon (LCOS) or a digital micro-mirror device (DMD). The transmissive spatial light modulator may be, for example, a transparent liquid crystal panel. The projection lens group may include a plurality of lenses, and the plurality of lenses may form a projection optical path.

The storage unit 150 may be a memory, such as a random-access memory (RAM), for the control unit 110 to access and execute. The storage unit 150 may be configured to store a control program, a keystone correction program, or a projection data and the like of related projection modules, and may also be configured to store related distance measurement information provided by the calculation unit 130 (or the ToF sensor 120).

Figure 2:
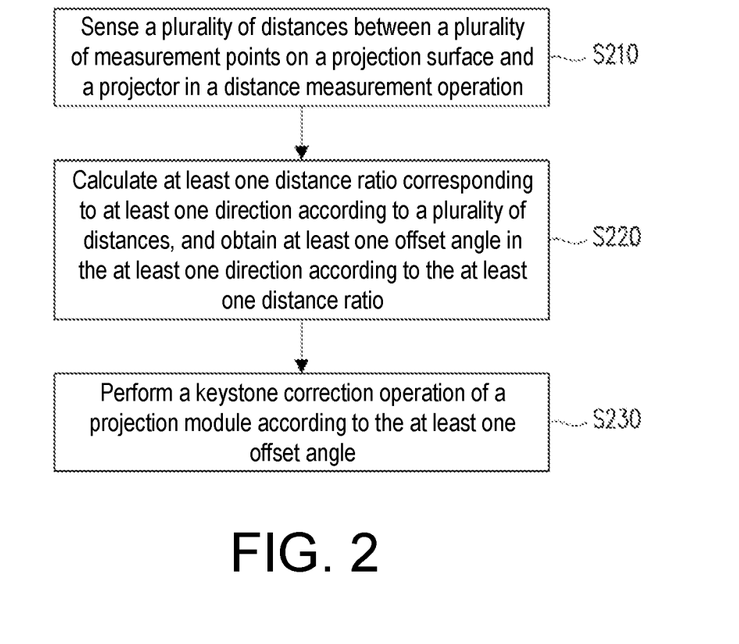
FIG. 2 is a flowchart of a correction method of a projector of an embodiment of the invention.

FIG. 2 is a flowchart of a correction method of a projector of an embodiment of the invention. Referring to FIG. 1 and FIG. 2, the projector 100 may perform the following steps S210 to S230 to implement keystone correction. In step S210, the projector 100 may sense a plurality of distances between a plurality of measurement points on a projection surface and the projector 100 in a distance measurement operation via the ToF sensor 120. In step S220, the calculation unit 130 of the projector 100 may calculate at least one distance ratio corresponding to at least one direction according to the plurality of distances, and obtain at least one offset angle in the at least one direction according to the at least one distance ratio. In step S230, the control unit 110 of the projector 100 may perform a keystone correction operation of the projection module 140 according to the at least one offset angle. The detailed method of obtaining the offset angle is described in the following embodiments.

It should be noted that the projector 100 performs a distance measurement operation and a keystone correction operation before the control unit 110 operates the projection module 140 to project a projection image. The control unit 110 first performs the distance measurement operation via the ToF sensor 120 and the calculation unit 130, so that the control unit 110 may correct the projection module 140 in advance, so that the corrected projection module 140 may provide a good projection effect of the projection image. In some other embodiments of the invention, the distance measurement operation and the keystone correction operation of the projector 100 may also be manually initiated and performed by a user. Or, in yet some other embodiments of the invention, the projector 100 may further include a motion sensor, wherein the motion sensor is coupled to the control unit 110. The motion sensor may be, for example, a G-sensor or a gyroscope. In the process of projecting the projection image via the projection module 140, the motion sensor may be used to sense in real time whether the position of the projector 100 is changed (such as being moved intentionally or unintentionally). As a result, when the control unit 110 senses a change in the position of the projector 100 via the motion sensor, the control unit 110 may operate (or start) the ToF sensor 120 to perform the distance measurement operation. Therefore, if the projection module 140 is moved during the process of projecting the projection image so that geometric distortion occurs to the projection image, the geometric distortion of the projection image may be automatically corrected in real time.

Figure 3:
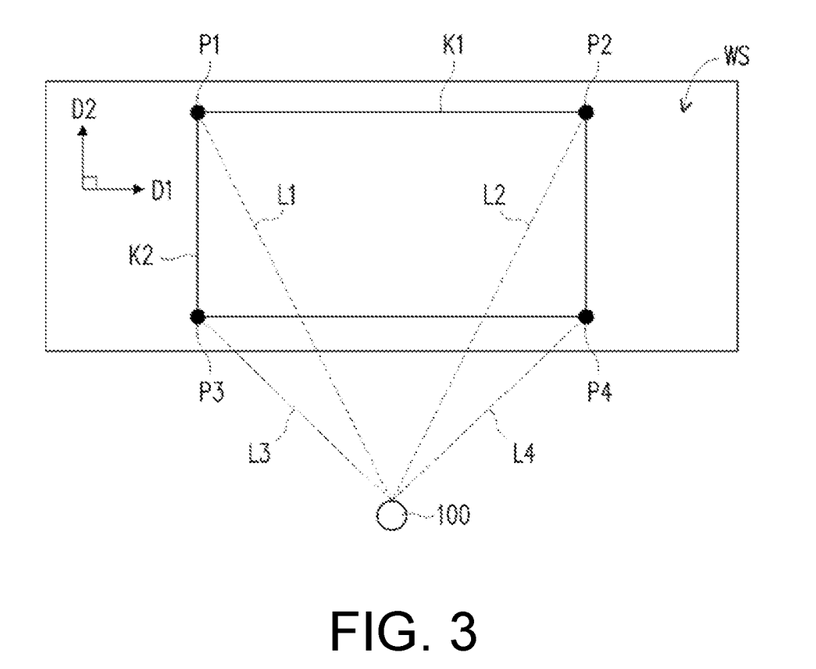
FIG. 3 is a schematic diagram of distance measurement of a time-of-flight (ToF) sensor of an embodiment of the invention.

FIG. 3 is a schematic diagram of distance measurement of a ToF sensor of an embodiment of the invention. Referring to FIG. 1 and FIG. 3, in the embodiment, the projector 100 may further include a light source, and the light source is configured to emit invisible light for distance sensing (sensing light). The light source may be a light-emitting diode (LED) or a laser diode (LD), and the sensing light may be infrared (IR). The light source and the ToF sensor 120 cooperate with each other. As shown in FIG. 2, the light source may emit a plurality of sensing lights toward a projection surface WS to a plurality of measurement points P1 to P4 in a time-sharing manner, and the ToF sensor 120 synchronously receives a plurality of reflected lights corresponding to the plurality of sensing lights in a time-sharing manner to obtain a plurality of distances L1 to L4 between the projector 100 (that is, the ToF sensor 120) and the measurement points P1 to P4, respectively.

It should be noted that in some embodiments of the invention, the measurement points P1 to P4 are not equivalent to the projection points of the projection module 140. The measurement points P1 to P4 may be, for example, four points in a projection image range projected by the light source in a fixed direction. Alternatively, in some other embodiments of the invention, the measurement points P1 to P4 may be equivalent to the projection points of the projection module 140. The measurement points P1 to P4 may, for example, correspond to the four projection points at the four corner positions of the boundary of the projection image range of the projection module 140.

It should be mentioned that, compared with a plurality of light sources emitting a plurality of sensing lights, and then obtaining a plurality of reflected lights by one or a plurality of ToF sensors, in the embodiment, the distance ratio for table lookup may be calculated directly using a plurality of distances via a multi-point distance measurement method of one-to-one light source and ToF sensor 120 at different times (based on the relative positions of the light source and the ToF sensor 120 being unchanged), without performing related numeric conversion calculations of relative positions for the plurality of distances. Therefore, the amount of data calculations may be effectively reduced, and a fast keystone correction function may be provided.

Since a direction of the distance measurement of the ToF sensor 120 has a fixed relationship with a projection beam projected by the projection module 140, the projector 100 may correspondingly correct the geometric distortion of the projection image of the projection module 140 by analyzing a plurality of distance sensing results provided by the ToF sensor 120. Specifically, the projection image projected by the projection module 140 has geometric distortion in the horizontal direction before the projection module 140 performs the keystone correction operation, there may be an included angle between a connecting line K1 of the measurement point P1 and the measurement point P2 of the ToF sensor 120 and the axis of a first direction D1.

When the projection module 140 has geometric distortion in the vertical direction, there may be an included angle between a connecting line K2 of the measurement point P1 and the measurement point P3 of the ToF sensor 120 and the axis of a second direction D2. The first direction D1 may be, for example, a horizontal direction, and the second direction D2 may be, for example, a vertical direction, wherein the first direction D1 and the second direction D2 are perpendicular to an optical axis (e.g., a chief ray of a projection beam of the projection module 140). Similarly, in the case where the projection module 140 has geometric distortion in both the horizontal direction and the vertical direction, there may be an included angle between both the connecting line K1 and the first direction D1 and between the connecting line K2 and the second direction D2.

Therefore, the calculation unit 130 may use the distance L1 as a reference value (may be predetermined or determined based on the magnitude of the value). The calculation unit 130 may divide the distance L2 by the distance L1 to obtain the distance ratio "L2/L1" (first distance ratio). The calculation unit 130 may divide the distance L3 by the distance L1 to obtain the distance ratio "L3/L1" (second distance ratio). The calculation unit 130 may obtain a first offset angle and a second offset angle corresponding to the vertical direction and the horizontal direction according to the distance ratio "L2/L1" and the distance ratio "L3/L1".

In the embodiment, the calculation unit 130 may be pre-built with a first lookup table (LUP) and a second LUP. The first LUP may be established in advance according to the offset angles in different horizontal directions to the corresponding distance ratios in different horizontal directions. The second LUP may be established in advance according to the offset angles in different vertical directions to the corresponding distance ratios in different vertical directions. In this way, the calculation unit 130 may search the first LUP and the second LUP according to the first distance ratio and the second distance ratio to obtain the first offset angle and the second offset angle. Therefore, the control unit 110 may perform a keystone correction operation on the projection module 140 according to the first offset angle and the second offset angle. Moreover, it should be mentioned that, if the first offset angle or the second offset angle is 0, the projection image projected by the projection module 140 does not have geometric distortion in the horizontal direction or the vertical direction, and there is no need to perform keystone correction operation in the horizontal direction or the vertical direction.

It should be noted that the calculation unit 130 of the invention may not be limited to the calculation method and is not limited to the above embodiments. In some embodiments of the invention, the calculation unit 130 may also use the distance L4 as the reference value. For example, using the reference value as the denominator for calculation, the calculation unit 130 may divide the distance L2 by the distance L4 to obtain the distance ratio "L2/L4". The calculation unit 130 may divide the distance L3 by the distance L4 to obtain the distance ratio "L3/L4". The calculation unit 130 may obtain the first offset angle and the second offset angle corresponding to the vertical direction and the horizontal direction according to the distance ratio "L2/L4" and the distance ratio "L3/L4". Or, in some embodiments of the invention, the control unit 110 may only perform a keystone correction operation in one of the vertical direction and the horizontal direction. Therefore, the calculation unit 130 may only calculate the distance ratio "L2/L1" or the distance ratio "L3/L1" to obtain the offset angle corresponding to one of the vertical direction and the horizontal direction.

In other embodiments, the calculation unit 130 may also use the distance L4 as the reference value, and add other parameters to the ratio and assign different weights to different parameters to improve accuracy.

In other embodiments, the ToF sensor 120 may emit a plurality of sensing lights to the vicinity of the measurement points P1 to P4 in a time-sharing manner to obtain the plurality of distances L1 to L4 near the measurement points P1 to P4. Therefore, the ToF sensor 120 may provide a plurality of distances L1 corresponding to the measurement point P1, a plurality of distances L2 corresponding to the measurement point P2, a plurality of distances L3 corresponding to the measurement point P3, and a plurality of distances L4 corresponding to the measurement point P4. Next, the calculation unit 130 may select (or calculate) one distance L1' to L4' from, for example, the median, the average, or the mode of the plurality of distances L1 to L4 to perform subsequent calculations. For example, the average of the plurality of distances L2 is used as the distance L2' and the distance L2' is used as the reference value.

Figure 4:
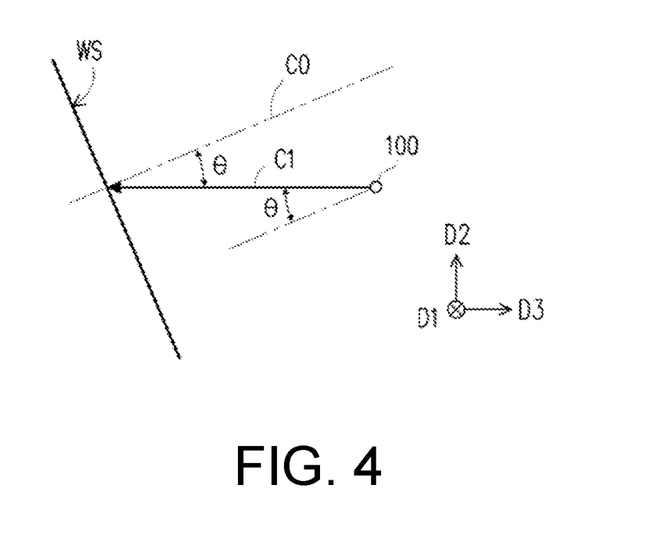
FIG. 4 is a schematic diagram of the projection of a projector of an embodiment of the invention.
Figure 5:
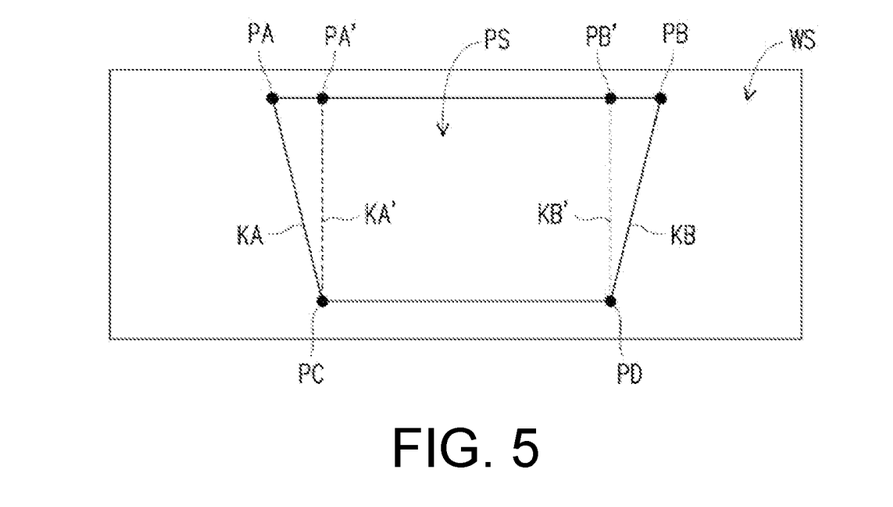
FIG. 5 is a schematic diagram of keystone correction of a projection image of an embodiment of the invention.

FIG. 4 is a schematic diagram of projection of a projector of an embodiment of the invention. FIG. 5 is a schematic diagram of keystone correction of a projection image of an embodiment of the invention. Referring to FIG. 1 and FIG. 3 to FIG. 5, as an example, a normal C0 of the projection surface WS is not parallel to the horizontal plane, and a projection central axis C1 of the projector 100 is parallel to the third direction D3. As shown in FIG. 4, the projection central axis C1 of the projector 100 (that is, the optical axis of the image beam) is not parallel to the normal C0 of the projection surface WS (i.e., the normal C0 of the projection surface WS is not parallel to the third direction D3). There is an offset angle θ (in the vertical direction) between the projection central axis C1 of the projection module 140 (that is, the axis along a third direction D3) and the normal C0 of the projection surface WS, wherein the projection central axis C1 may be the main optical axis (chief ray) of the projection beam, and a length of the projection central axis C1 (from the projector 100 to the projection surface WS) is not equal to the distances L1 to L4.

Therefore, before the keystone correction operation is performed, a projection image PS (range defined by end point PA, end point PB, end point PC, and end point PD) shown in FIG. 5 has a geometric distortion in the vertical direction. The projection central axis C1 of the projector 100 is extended along the axis of the third direction D3, and the third direction D3 is perpendicular to the first direction D1 and the second direction D2 (i.e., the vertical direction). There is an included angle between a connecting line KA of an end point PA and an end point PC of the projection image PS and the axis in the vertical direction D2, and there is an included angle between a connecting line KB of an end point PB and an end point PD of the projection image PS and the axis in the vertical direction D2, so that the projection image PS is in a keystone distortion state.

In this regard, the calculation unit 130 may divide the distance L3 by the distance L1 as in the above embodiment of FIG. 3 to obtain the distance ratio "L3/L1", and obtain the corresponding offset angle θ via the LUP shown in Table 1 below. The control unit 110 may perform a keystone correction operation on the projection module 140 according to the offset angle θ, so that the position of the end point PA of the corrected projection image PS may be corrected to the position of an end point PA', and the position of the end point PB of the corrected projection image PS may be corrected to the position of an end point PB'. As a result, a connecting line KA' of the corrected end point PA' and the end point PC of the projection image PS may be parallel or nearly parallel to the axis of the vertical direction D2 (that is, compared to before the correction, there may not be an included angle or there is a smaller included angle between the connecting line KA' and the axis of the vertical direction D2), and a connecting line KB' of the corrected end point PB' and the end point PD of the projection image PS may be parallel or nearly parallel to the axis of the vertical direction D2 (that is, compared to before the correction, there may not be an included angle or there is a smaller included angle between the connecting line KB' and the axis of the vertical direction D2). Therefore, after the projection module 140 undergoes the keystone correction operation, the projected projection image PS may be displayed as a rectangle or nearly rectangle image result.

TABLE 1

| Ratio (L3/L1) | Offset angle θ |
| --- | --- |
| L3/L1 = 0.72 | θ = −3 |
| L3/L1 = 0.8 | θ = −2 |
| L3/L1 = 0.91 | θ = −1 |
| L3/L1 = 1 | θ = 0 |
| L3/L1 = 1.1 | θ = 1 |
| L3/L1 = 1.24 | θ = 2 |
| L3/L1 = 1.39 | θ = 3 |

It should be noted that the application context of the invention is not limited to the embodiment of FIG. 4. In some embodiments of the invention, the projection correction operation of the invention may also be used for other abnormal (inclined) configurations of the projection surface. For example, the normal of the projection surface is not parallel to the vertical surface, so that the projection image may have geometric distortion in the horizontal direction, or the normal of the projection surface is not parallel to the horizontal plane and the vertical plane. As a result, the projection image may have geometric distortion in both the horizontal direction and the vertical direction. In some other embodiments of the invention, the projection correction operation of the invention may also be used for an abnormal (inclined) configuration of the projector 100. For example, the projection central axis of the projector 100 is not parallel to the horizontal plane and/or the vertical plane, so that the projection image may have geometric distortion in the horizontal direction and/or the vertical direction. Or even, in yet some other embodiments of the invention, the projection correction operation of the invention may also be used for an abnormal (inclined) configuration of both the projection surface and the projector 100.

Figure 6:
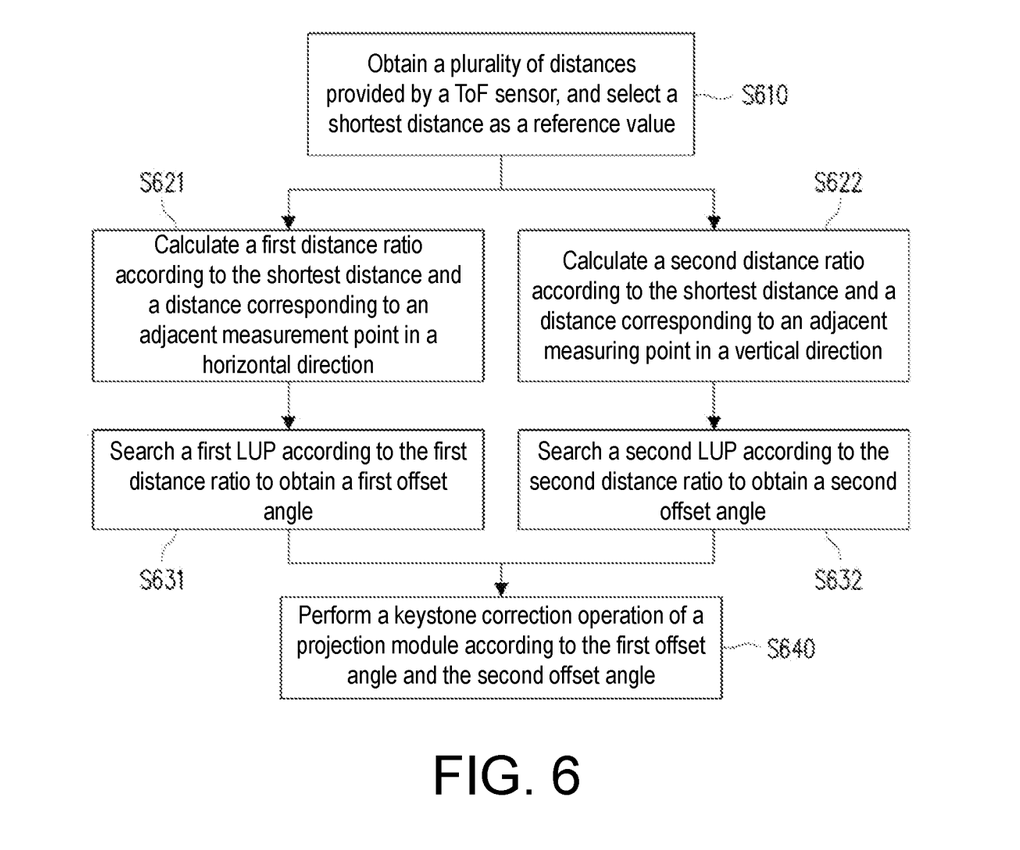
FIG. 6 is a flowchart of a keystone correction operation of another embodiment of the invention.

FIG. 6 is a flowchart of a keystone correction operation of another embodiment of the invention. Referring to FIG. 1, FIG. 3, and FIG. 6, in some other embodiments of the invention, the control unit 110 may select one of the plurality of distances L1 to L4 as the shortest distance (the smallest value) as the reference value. The control unit 110 may perform the following steps S610 to S640.

In step S610, the control unit 110 may obtain the plurality of distances L1 to L4 provided by the ToF sensor 120, and select the shortest distance as the reference value. In step S621, the control unit 110 may calculate a first distance ratio based on the shortest distance and the distance corresponding to an adjacent measurement point in the horizontal direction. In step S631, the control unit 110 may search a first LUP according to the first distance ratio to obtain a first offset angle. In step S622, the control unit 110 may calculate a second distance ratio based on the shortest distance and the distance corresponding to an adjacent measurement point in the vertical direction. In step S632, the control unit 110 may search a second LUP according to the second distance ratio to obtain a second offset angle. In step S640, the control unit 110 may perform a keystone correction operation of the projection module 140 according to the first offset angle and the second offset angle.

Therefore, the projection module 140 after the keystone correction operation may provide a projection function with good projection image quality of lower geometric distortion. In addition, it should be noted that the invention does not limit the execution sequence of steps S621 and S631 and steps S622 and S632. The control unit 110 may first calculate the offset angle in the horizontal direction, and then calculate the offset angle in the vertical direction. Or, the control unit 110 may first calculate the offset angle in the vertical direction, and then calculate the offset angle in the horizontal direction. Alternatively, the control unit 110 may simultaneously calculate the offset angles in the horizontal direction and the vertical direction via two functional arithmetic circuits.

Based on the above, the projector and the correction method thereof of the invention may sense a plurality of distances between the projector and a plurality of measurement points on the projection surface via ToF, and pre-recorded LUPs may be searched by calculating the distance ratio of the plurality of distances, so as to quickly obtain the offset angle of the projection module in the horizontal direction and/or the vertical direction. Therefore, the projector and the correction method thereof of the invention automatically perform a quick and effective keystone correction operation of the projection module, so that the projector may provide good projection image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, wherein the projector comprises a time-of-flight (ToF) sensor, a calculation unit, a control unit, and a projection module:
    the ToF sensor is configured to sense a plurality of distances between a plurality of measurement points on a projection surface and the projector in a distance measurement operation,
    the calculation unit is coupled to the ToF sensor and configured to select a shortest distance from the plurality of the distances, calculate a first distance ratio based on the shortest distance and one of the plurality of distances corresponding to an adjacent measurement point in a first direction, search a first lookup table according to the first distance ratio to obtain a first offset angle, calculate a second distance ratio based on the shortest distance and one of the plurality of distances corresponding to an adjacent measurement point in a second direction, and search a second lookup table according to the second distance ratio to obtain a second offset angle,
    the control unit is coupled to the calculation unit and the ToF sensor; and
    the projection module is coupled to the control unit, wherein
    the control unit performs a keystone correction operation of the projection module according to the first offset angle and the second offset angle.

2. The projector of claim 1, wherein the ToF sensor senses a first distance, a second distance, and a third distance respectively between a first measurement point, a second measurement point, and a third measurement point on the projection surface and the projector, wherein a connecting line of the first measurement point and the second measurement point is perpendicular to a connecting line of the first measurement point and the third measurement point.

3. The projector of claim 2, wherein there is an included angle between the connecting line of the first measurement point and the second measurement point and an axis along the first direction, and/or there is an included angle between the connecting line of the first measurement point and the third measurement point and an axis along the second direction, wherein the first direction is perpendicular to the second direction.

4. The projector of claim 3, wherein the first direction is a horizontal direction, and the second direction is a vertical direction, wherein the first direction and the second direction are perpendicular to an optical axis of the projection module.

5. The projector of claim 3, wherein the calculation unit divides the second distance by the shortest distance to obtain the first distance ratio, and the calculation unit divides the third distance by the shortest distance to obtain the second distance ratio.

6. The projector of claim 1, wherein the projector further comprises a motion sensor, the motion sensor is coupled to the control unit, and when the motion sensor senses a change in a position of the projector, the control unit operates the ToF sensor to perform the distance measurement operation.

7. The projector of claim 1, wherein before the control unit operates the projection module to project a projection image, the control unit first performs the distance measurement operation.

8. The projector of claim 1, wherein the projector further comprises a light source, and the light source is configured to emit a plurality of sensing lights to the plurality of measurement points on the projection surface in a time-sharing manner in the distance measurement operation, so that the ToF sensor receives a plurality of reflected lights corresponding to the plurality of sensing lights in a time-sharing manner to obtain the plurality of distances.

9. The projector of claim 8, wherein the light source is a light-emitting diode or a laser diode, and the sensing lights are infrared.

10. A correction method of a projector, wherein the projector comprises a ToF sensor, a calculation unit, a control unit, and a projection module, and the correction method comprises:

sensing a plurality of distances between a plurality of measurement points on a projection surface and the projector in a distance measurement operation via the ToF sensor;

selecting a shortest distance from the plurality of the distances;

calculating a first distance ratio based on the shortest distance and one of the plurality of distances corresponding to an adjacent measurement point in a first direction;

searching a first lookup table according to the first distance ratio to obtain a first offset angle;

calculating a second distance ratio based on the shortest distance and one of the plurality of distances corresponding to an adjacent measurement point in a second direction;

searching a second lookup table according to the second distance ratio to obtain a second offset angle;

performing a keystone correction operation of the projection module according to the first offset angle and the second offset angle via the control unit.

11. The correction method of claim 10, wherein the step of sensing the plurality of distances between the plurality of measurement points on the projection surface and the projector comprises:

sensing a first distance, a second distance, and a third distance respectively between a first measurement point, a second measurement point, and a third measurement point on the projection surface and the projector via the ToF sensor, wherein a connecting line of the first measurement point and the second measurement point is perpendicular to a connecting line of the first measurement point and the third measurement point.

12. The correction method of claim 11, wherein there is an included angle between the connecting line of the first measurement point and the second measurement point and an axis along the first direction, and/or there is an included angle between the connecting line of the first measurement point and the third measurement point and an axis along the second direction.

13. The correction method of claim 12, wherein the first direction is a horizontal direction, and the second direction is a vertical direction, wherein the first direction and the second direction are perpendicular to an optical axis of the projection module.

14. The correction method of claim 12, wherein the step of calculating the first distance ratio comprises:

dividing the second distance by the shortest distance via the calculation unit to obtain the first distance ratio, wherein the step of calculating the second distance ratio comprises:

dividing the third distance by the shortest distance via the calculation unit to obtain the second distance ratio.

15. The correction method of claim 10, wherein the projector further comprises a motion sensor, and the correction method further comprises:

operating the ToF sensor via the control unit to perform the distance measurement operation when the motion sensor senses a change in a position of the projector.

16. The correction method of claim 10, wherein before the control unit operates the projection module to project a projection image, the control unit first performs the distance measurement operation.

17. The correction method of claim 10, wherein the projector further comprises a light source, and the step of sensing the plurality of distances between the plurality of measurement points on the projection surface and the projector in the distance measurement operation via the ToF sensor comprises:

emitting a plurality of sensing lights to the plurality of measurement points on the projection surface in a time-sharing manner in the distance measurement operation via the light source, so that the ToF sensor receives a plurality of reflected lights corresponding to the plurality of sensing lights in a time-sharing manner to obtain the plurality of distances.

18. The correction method of claim 17, wherein the light source is a light-emitting diode or a laser diode, and the sensing lights are infrared.

* * * * *